June 8, 1965 H. ELLIS 3,187,437
COMBINED MEASURING AND SCRIBING DEVICE
Filed Oct. 11, 1962 2 Sheets-Sheet 1

Hampton Ellis
INVENTOR.

BY *Clarence A. O'Brien*
*and Harvey B. Jacobson*
Attorneys

June 8, 1965  H. ELLIS  3,187,437
COMBINED MEASURING AND SCRIBING DEVICE
Filed Oct. 11, 1962  2 Sheets-Sheet 2

Hampton Ellis
INVENTOR.

3,187,437
COMBINED MEASURING AND SCRIBING DEVICE
Hampton Ellis, Warren, Mich.
(17330 Martin Road, Roseville, Mich.)
Filed Oct. 11, 1962, Ser. No. 229,953
11 Claims. (Cl. 33—88)

This invention relates to a geometrical device for measuring and scribing purposes and more particularly, to a multi-purpose tool having measuring components which are both cooperatively and independently useful in connection with the measurement, gauging and scribing of angles, surfaces, etc.

It is therefore a primary object of the present invention to provide a multi-purpose measuring and scribing device which is particularly useful in connection with the scribing and checking of compound angles, gauging of curved surfaces, as a drill gauge, and for other similar purposes.

The multi-purpose tool or instrument of the present invention is particularly useful in connection with the aforementioned purposes because of a novel magnetic holding feature whereby the tool body member or head may be anchored by magnetic attraction along two perpendicular reference surfaces. The magnetic holding means is also selectively positioned to an inoperative position when no anchoring is desired.

An important object of the present invention therefore, is to provide a device having a plurality of removable scale members capable of being angularly positioned in different planes for measurement and checking of compound angles.

A still further object of the present invention is to provide an implement capable of being magnetically secured to a surface, the level of which may be gauged, whether it be vertical or horizontal.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
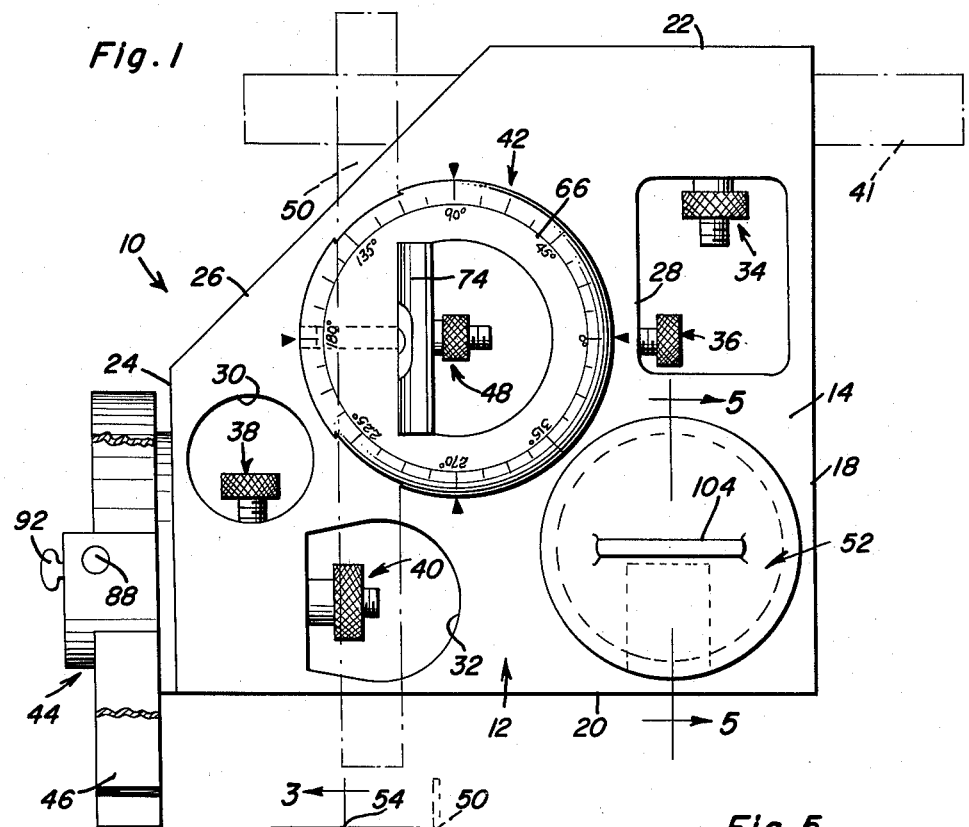
FIGURE 1 is a top plan view of the device of the present invention.

Referring now to the drawings in detail, it will be observed that the device of the present invention generally referred to by reference numeral 10 includes a reference body member or head 12 made of non-ferrous material, preferably aluminum on which the vaious components of the device are mounted. The body member 12 is therefore provided with parallel side faces including a front face 14 and a rear face 16 which are interconnected by five edge faces. Two of the edge faces 18 and 20 are intersecting, perpendicular reference surfaces which are also capable of being anchored by magnetic attraction to some magnetically conductive material or ferrous metal surfaces as will hereafter be explained. The reference surfaces formed by the faces 18 and 20 are therefore disposed in perpendicular planes which are also perpendicular to the reference plane in which the front face 14 lies. The reference edge faces 18 and 20 are also connected to edge faces 22 and 24 respectively disposed perpendicular to the edge faces 18 and 20. A 45° edge face 26 interconnects the edge faces 22 and 24 at 45° angles to thereby complete the configuration of the body member 12. The body member is however formed with a rectangular opening 28 disposed adjacent the edge face 18, a circular opening 30 disposed adjacent to the edge face 24 and an arcuate opening 32 which is disposed adjacent to the edge face 20. The openings 28, 30 and 32 are provided for the purpose of exposing the knurled adjusting knobs of friction lock devices 34, 36, 38 and 40. The friction lock device 34 exposed within the opening 28, is provided for the purpose of releasably securing a scale member or ruler 41 to the body member adjacent to the edge face 22. The friction lock device 36 also exposed within the opening 28, is provided for the purpose of locking a protractor component 42 in an adjusted angular position. The friction lock device 38 exposed within the opening 30, is operative to lock a protractor component 44 in an adjusted angular position. The friction lock device 40 exposed within the opening 32 is operative to releasably secure the scale member 46 to the protractor component 44. An additional friction locking device 48 is provided and mounted by the protractor 42 for the purpose of releasably securing thereto, the scale 50 which is thereby rotatable with the protractor 42 and projects beyond the edge face 26. Finally, the body member 12 also mounts a magnetic holding device generally referred to by reference numeral 52.

Figure 2:
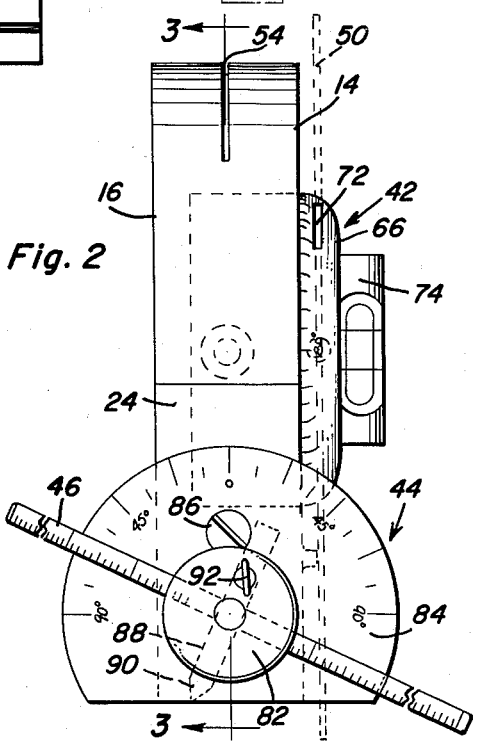
FIGURE 2 is a front elevational view of the device illustrated in FIGURE 1.
Figures 3, 4, 6:
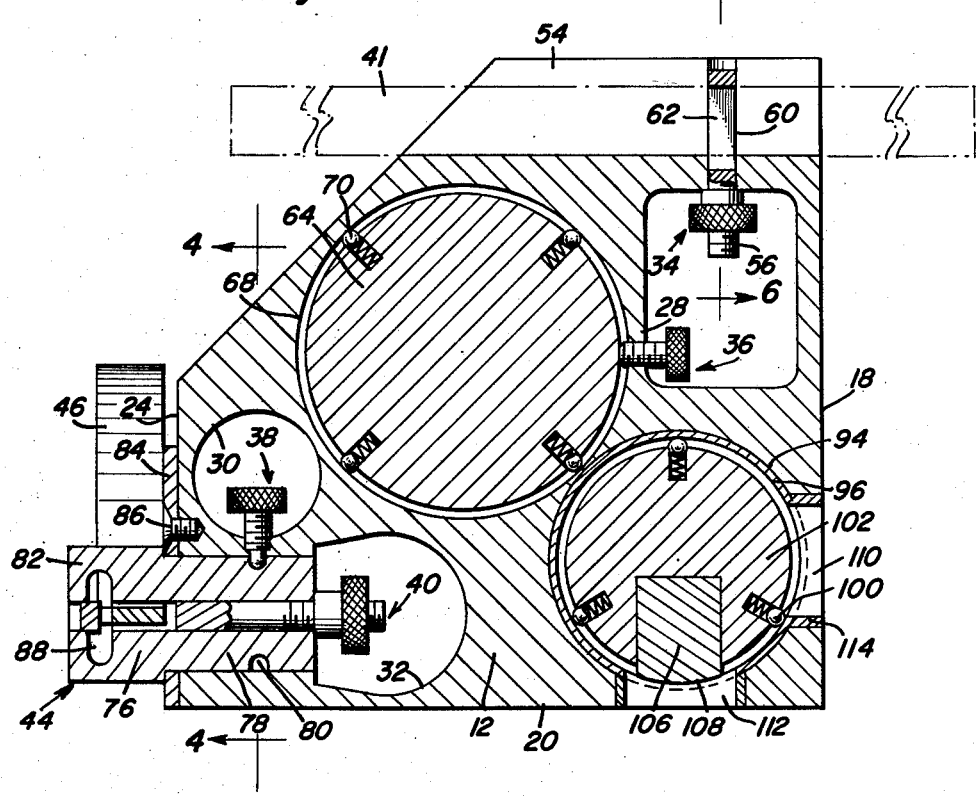
FIGURE 3 is a sectional view taken substantially through a plane indicated by section line 3—3 in FIGURE 2.
FIGURE 4 is a sectional view taken substantially through a plane indicated by section line 4—4 in FIGURE 3.
FIGURE 6 is a partial sectional view taken substantially through a plane indicated by section line 6—6 in FIGURE 3.

As more clearly seen from FIGURES 2 and 3, the edge face 22 of the body member is slotted at 54 for slidably receiving the scale 41 which is releasably secured to the body member by means of the friction locking device 34. Thus, the friction locking device includes an externally threaded locking element 56 with which the internally threaded knurled adjusting member 58 is engaged. Accordingly, rotational adjustment of the adjusting element 58 will be operative to axially displace the locking element 56 with respect to a bore formed in the body member therefor such as the bore 60 which intersects the slot 54 within which the scale member 41 is received. The locking element is therefore provided with a slot 62 aligned with the slot 54 so as to receive the scale 41 therethrough. It will therefore be appreciated, that axial displacement of the locking element 56 in one direction will lock the scale 41 between the upper edge of the slot 62 and the bottom edge of the slot 54. Similar locking facilities are provided for the scale members 46 and 50 by the locking devices 40 and 48. The scale member 41 may therefore serve with the scale member 50, as the usual angle measuring and checking instrument for corners or the like.

The scale 50 is therefore rotatable with the protractor 42 by means of which the angle may be measured in a plane parallel to the scale members 41 and 50. The protractor 42 includes a rotatable member 64 having an exposed surface 66 on which suitable indicia is inscribed for angle measurement purposes. The rotatable member 64 is rotatable within a circular recess 68 formed in the body member 12 for such purposes. A plurality of spring-urged bearing elements 70 are carried by the rotatable member 64 for frictionless mounting of the member within the circular recess. The rotatable member 64 may however be locked in an angularly adjusted position by the friction lock device 36 as more clearly seen in FIG-URE 3. On the exposed porton of the member 64, there is provided a slot 72 through which the scale 50 is slidably received. The scale 50 is releasably locked within the slot 72 by means of the friction lock device 48 in a manner similar to that described with respect to the friction lock device 34. Also mounted on the exposed surface 66 of the protractor 42, is a level indicating bubble device 74. It will be apparent therefore, that the level indicating device 74 may be used and viewed from either side of the body member 12 by merely rotating the protractor 180° from any one position.

The other protractor component 44 is rotatable about an axis perpendicular to the rotational axis of the protractor 42 so that the scale member 46 may be positioned at some angle in a plane perpendicular to the plane of the scale member 50. Accordingly, the protractor 44 is provided with a rotatable spindle 76 having a narrow diameter portion 78 rotatably mounted within the body member 12 and through which the friction lock device 40 extends. Engageable with an annular groove 80 in the portion 78 of the rotatable spindle, is the lock device 38 for the purpose of locking the rotatable spindle in an angular position with respect to the body member. The large diameter end portion 82 of the rotatable spindle is spaced from the end face 24 so as to accommodate the protractor scale element 84 which is secured to the end face 24 by the fastener element 86. Thus, a removable protractor plate 84 is provided with suitable indicia thereon for angle measurement purposes. The large diameter end portion 82 of the rotatable spindle is therefore provided with a slot for receiving therewithin the scale 46. The scale 46 is locked in position by means of the friction locking device 40 in a manner similar to that described with respect to the friction locking device 34. The scale 46 cooperates with the fixed protractor plate 84 for measuring angles in the plane parrallel to the end faces 18 and 24. Also provided in the large diameter end portion 82 of the rotatable spindle, is a diametral bore 88 disposed perpendicular to the slot through which the scale 46 extends, said bore adapted to receive a scribing element 90 held in position within the bore by means of the setscrew element 92.

Figure 5:
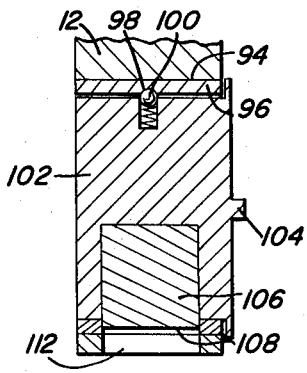
FIGURE 5 is a partial sectional view taken substantially through a plane indicated by section line 5—5 in FIGURE 1.

Referring now to FIGURES 1 and 5 in particular, it will be observed that the body member 12 is provided with a circular opening 94 lined with an insulator 96 having high magnetic reluctance properties. An annular bearing groove 98 is formed within the liner 96 adapted to receive there within the spring-urged bearing elements 100 carried by a rotatable carrier member 102 of the magnetic holding device 52. Accordingly, a projecting grip formation 104 is formed on the exposed surface of the carrier member 102 so that it may be angularly positioned with respect to the circular opening 94 in the body member. The carrier member 102 mounts there within a magnetic element or permanent magnet 106 having an exposed pole face 108 from which magnetic flux may emerge to establish a magnetic holding force when the magnet 106 is exposed by alignment with the openings 110 and 112 in the end faces 18 and 20 respectively. The openings 110 and 112 are therefore lined with magnetic insulating material 114 so that magnetic flux will be confined to one end face at a time when the magnet is aligned with the openings 110 or 112. The body member 12 may thereby be anchored either along its end face 18 or end face 20 by selective positioning of the magnetic carrier member 102. It will also be apparent, that the magnetic carrier member may be so positioned so that the magnet 106 is held in an ineffective position magnetically shielded by the liner 94 when anchoring of the body member 12 is not desired.

From the foregoing description, the construction and utility of the device of the present invention will be apparent. It will therefore be appreciated, that the protractor component 44 with the scriber and scale attachments, renders the device useful for laying out and checking compound angles and also as a surface gauge. The mounting of the level indicating device 74 on the protractor 42 also enables use of the device for level indicating purposes from any side. Also, in connection with the protractor 42, level indicating device 74 and the sliding scale 50 projecting beyond the end face 26, it will be appreciated that the device may be used as a drill gauge. Although each of the protractor components is capable of use independent of each other, it will be realized that they may cooperate with each other for the measurement of compound angles and further cooperate with the selectively positioned magnetic holding component 52 for measuring and leveling purposes. Accordingly, the device of the present invention will be useful for a variety of purposes as well as to provide a more accurate and easily applied device in connection with some of the uses.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restorted to, falling within the scope of the invention as claimed.

What is claimed as new is as follows:

1. In a combined measuring and scribing device, a body member having at least three reference surfaces disposed respectively in three intersecting planes, at least two protractors rotatably mounted by said body member, selectively positioned holding means mounted on said body member equally spaced from two of said three reference surfaces for releasably anchoring said body member along one of said two reference surfaces, level indicating means mounted by one of said protractors for movement therewith about an axis parallel to said two reference surfaces, and gauging means mounted on the other of said protractors for angular displacement about an axis perpendicular to one of said two surfaces.

2. The combination of claim 1, including scale means releasably secured to each of said protractors and to the body member.

3. The combination of claim 2, wherein said selectively positioned holding means comprises, a rotatable carrier, a magnetic element mounted by said carrier, means rotatably mounting said carrier in the body member for exposing said magnetic element to said two reference surfaces in two positions of said carrier, and high magnetic reluctance insulating means mounted by the body member for restricting magnetic flux paths to the carrier in all positions thereof except said two positions.

4. The combination of claim 3, including friction lock means mounted by said body member for locking said protractor means and said scale means to the body member.

5. The combination of claim 1, wherein said selectively positioned holding means comprises, a rotatable carrier, a magnetic element mounted by said carrier, means rotatably mounting said carrier in the body member for exposing said magnetic element to said two reference surfaces in two positions of said carrier, and high magnetic reluctance insulating means mounted by the body member for restricting magnetic flux paths to the carrier in all positions thereof except said two positions.

6. The combination of claim 1, including friction lock means mounted by said body member for locking said protractor means to the body member.

7. In a combined measuring device, a body member having at least three reference surfaces disposed respectively in three intersecting planes, two protractors rotatably mounted by said body member about axes disposed in perpendicular spaced relation to each other, level indicating means mounted on one of said protractors for measuring angular displacement of two of the three reference surfaces from a level position, engaging means mounted on the other of said protractors for angular displacement in a plane parallel to one of said two reference surfaces, friction lock means mounted by said body member for locking said protractors to the body member, said body member comprising a block made of non-ferrous material having parallel side faces interconnected by five edge faces, an intersecting pair of said edge faces forming two of said reference surfaces, a second pair of edge faces respectively mounting one of the protractors parallel to one of said reference surfaces and the remaining edge face interconnecting said second pair of edge faces at equal intersecting angles.

8. The combination of claim 7 including selectively positioned magnetic means rotatably mounted by the body member for exposure through one face of said intersecting pair of edge faces for anchoring the body member.

9. A measuring device comprising, a body member having a plurality of intersecting edge faces, holding means rotatably mounted by the body member equally spaced from two of said intersecting edge faces for selectively establishing either one of said two intersecting edge faces operative as an anchoring surface, a protractor rotatably mounted by the body member about an axis parallel to all of said edge faces, and level indicating means carried by said protractor for measuring angular displacement of the anchoring surface established by the holding means from a level position.

10. The combination of claim 9 including gauging means movably mounted on at least two of the other edge faces respectively disposed parallel to and perpendicular to the anchoring surface established by the holding means.

11. In a combined measuring device, a non-magnetic body member having at least three reference surfaces disposed respectively in three intersecting planes, two protractors rotatably mounted by said body member about axes disposed in perpendicular spaced relation to each other, lock means mounted by said body member for holding the protractors in adjusted positions on the body member, level indicating means mounted on one of said protractors for measuring angular displacement of two of the three reference surfaces from a level position, gauging means mounted on the other of said protractors for angular displacement in a plane parallel to one of said two reference surfaces, and selectively positioned magnetic means rotatably mounted by the body member for exposure through either one of said two reference surfaces to anchor the body member.

References Cited by the Examiner

UNITED STATES PATENTS

| 651,037 | 6/00 | Hawkins | 33—88 X |
|---|---|---|---|
| 1,264,161 | 4/18 | Costas | 33—89 |
| 1,772,925 | 8/30 | Wernicke | 33—102 X |
| 3,070,887 | 1/63 | Olsen | 33—75 |
| 3,089,066 | 5/63 | Uc et al. | 317—159 |

FOREIGN PATENTS 141,792    8/53    Sweden.

ISAAC LISANN, *Primary Examiner.*